Figure 1:
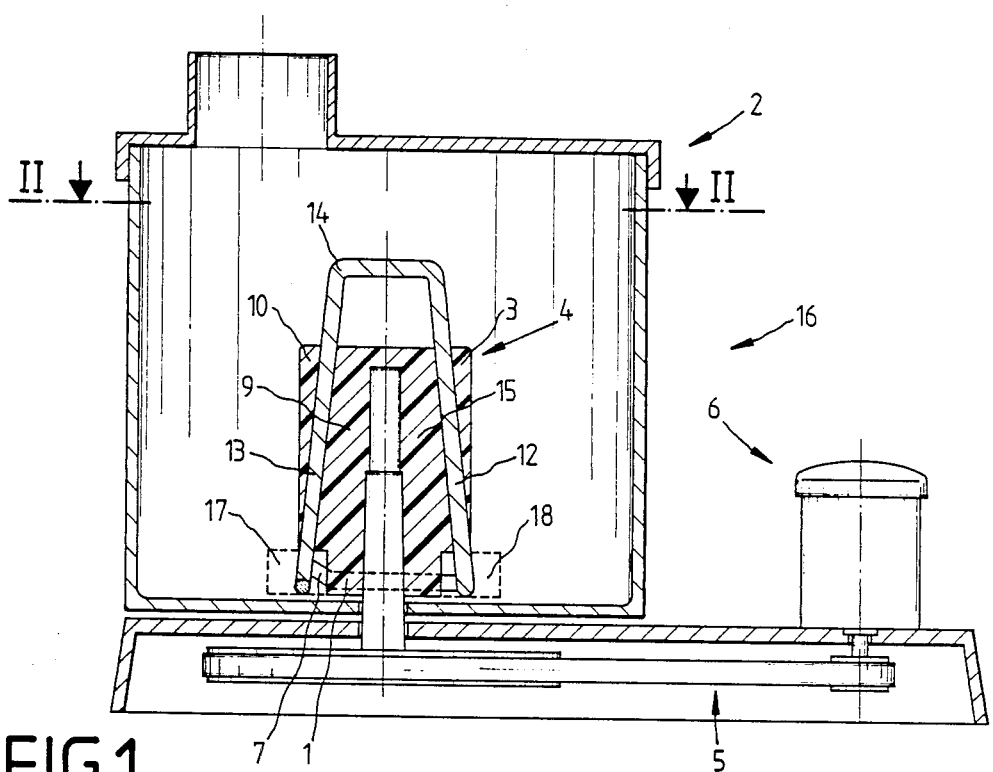

United States Patent [19]

Kullen et al.

[11] Patent Number: 4,842,416
[45] Date of Patent: Jun. 27, 1989

[54] AGITATING AND KNEADING TOOL

[75] Inventors: Albrecht Kullen, Wörthsee-Steinebach; Manfred Klawuhn, Frankfurt; Sigrun Hickel, Waldems; Wolfgang Franke, Langen, all of Fed. Rep. of Germany

[73] Assignee: Braun Aktiengesellschaft, Kronberg, Fed. Rep. of Germany

[21] Appl. No.: 29,087

[22] Filed: Mar. 23, 1987

[30] Foreign Application Priority Data

Mar. 29, 1986 [DE] Fed. Rep. of Germany ....... 3610740

[51] Int. Cl.$^4$ .......................... B01F 7/20; A21C 1/02
[52] U.S. Cl. ..................................... 366/314; 366/98; 366/326
[58] Field of Search ............... 366/280, 308, 314, 325, 366/326, 331, 343, 129, 327, 97, 98, 100; 416/223 R, 240 R, 204 R, 70 R; 241/101.1, 282.2, 282.1, 277

[56] References Cited

U.S. PATENT DOCUMENTS

| | | | |
|---|---|---|---|
| 504,112 | 8/1893 | Paine | 416/70 |
| 1,169,026 | 1/1916 | Genter | 366/97 X |
| 1,430,070 | 9/1922 | Franzwa | 366/326 X |
| 1,598,399 | 8/1926 | Simmonds | 366/343 X |
| 2,723,839 | 11/1955 | Lorenz et al. | 366/314 |
| 2,991,051 | 7/1961 | Jones | 366/326 X |
| 3,355,152 | 11/1967 | Otto | 366/325 X |
| 4,155,656 | 5/1979 | Kramer | 366/98 |

FOREIGN PATENT DOCUMENTS

| | | | |
|---|---|---|---|
| 91825 | 10/1983 | European Pat. Off. | |
| 1554642 | 7/1977 | Fed. Rep. of Germany | |
| 3433008 | 9/1987 | Fed. Rep. of Germany | |
| 266155 | 4/1950 | Switzerland | 366/314 |
| 313755 | 5/1956 | Switzerland | 366/314 |
| 730156 | 5/1955 | United Kingdom | 366/314 |
| 2153659 | 8/1985 | United Kingdom | 241/282.2 |

Primary Examiner—Harvey C. Hornsby
Assistant Examiner—Scott J. Haugland

[57] ABSTRACT

The present invention relates to an agitating and kneading tool (4) for being inserted into the center of a mixing bowl (2) of an electrically driven household appliance (16). The agitating and kneading tool (4) is conventionally composed of a hub (15) to which two differently shaped types of single tools (3, 10 and 1, 8) are fitted and which are drivable by a drive shaft (9) which preferably extends through the container bottom. It is suggested to furnish the hub (15) with a larger diameter in its lower area than in its upper area, in particular, to give it a conical shape. In its lower area, the hub (15) disposes of one or more single tools (1, 8) in the form of laterally projecting agitating arms, the said tools extending closely adjacent to the bottom in parallel to said. In the upper area of the hub (15), there is provision of one or more single tools in the form of kneading blades (3, 10). The agitating and kneading tool (4) according to this invention is preferably destined for use in household appliances (10), in which especially doughy masses must be kneaded, while, simultaneously, ingredients such as almonds, raisins etc. must be admixed.

8 Claims, 1 Drawing Sheet

AGITATING AND KNEADING TOOL

The present invention relates to an agitating and kneading tool for being inserted into electrically driven household and kitchen appliances.

Agitating and kneading tools which are inserted into the centre of a container of a kitchen machine are known in various designs. In general, the centre of a mixing bowl accommodates a drivable swivel carrying one or more single tools which may even be of different shape in individual cases. The swivel is driven in many embodiments in dependence on an electric motor via a drive shaft which extends sealedly through the bottom of the mixing bowl. It is likewise known to have the swivel's drive descend from above.

Such agitating and kneading tools are used for mixing and kneading viscous up to pasty or also granular matter and/or mixtures of such goods. It is a special feature that occasionally goods of quite different consistency must be treated with the same kneading tool, what means that the capacity of the tool's drive must be rated to conform to the most viscous matter that is possibly to be treated, or that the drive must be provided with corresponding safety devices in order to avoid overload or damages which might occur when treating doughs more viscous than expected. However, such safety devices are costly and inhere additional susceptibility to fail conditions.

A special problem in connection with the agitating and kneading of pasty matter is the admixing of grained or granulate additions such as admixing crushed almonds, raisins or the like into a dough for cakes. On the one hand, the added ingredients are to be mixed well, what preconditions an intense mixing action, whilst, on the other hand, they must not be crushed or smashed by the single tools, say the agitating arms of the swivel.

It is common knowledge to equip the swivel in an agitating and kneading tool with various single tools which perform different functions when agitating, mixing and kneading the matter to be treated. Thus, German examined patent application No. 15 54 642 discloses a multiarmed agitating and kneading tool which is appropriate for use in the mixing bowl of an electrically driven household and kitchen appliance. In this priorly known agitating and kneading tool, the mixing bowl is shaped such that in its centre an internal dome is formed for mounting a vertically arranged drive shaft driven from downwards. At the upper end of the drive shaft which penetrates the dome formed in the bowl upwardly, a hub can be coupled which carries one or more kneading arms that extend from above into the bowl and are deflected in opposition to the direction of rotation. In this arrangement, at least one kneading arm is designed as a thin arm conformed to the contour of the internal dome and extending over the bottom of the mixing bowl. During the rotary movement, the agitated dough is in each case lifted from the internal dome for a short time before it abuts again on the wall of the internal dome immediately after the kneading arm has passed. When treating viscous or pasty matter, this has a consequence that the agitated dough creeps up the wall of the internal dome and may enter from there into the hub of the agitating tool what should be prevented by all means.

To prevent the agitated matter from creeping upwards, in the priorly known design, a scraper as another single tool has been mounted on the hub, which scraper is deflected in radial direction as well as in opposition to the direction of rotation. It is the purpose of this scraper to urge the agitated matter which during stirring reached the upper zone of the internal dome downwards again.

The agitating and kneading tool displayed in the laid-out print is only to a limited extent apt for treating particularly pasty matter. The per se thin kneading arm would necessitate a very high torque at the drive shaft when penetrating a particularly viscous and pasty matter.

Another example for an agitating instrument equipped with several single tools is shown in EP-A No. 0091825. The agitating instrument disclosed in the cited publication is above all apt for making soft ice from ice blocks. The centre of a container accommodates a drive shaft extending through the bottom of the container in a sealed relationship therewith. Seated on this drive shaft is a hub which can be coupled with the drive shaft and which carries in its upper area a horizontally arranged disc furnished with radial cutting edges. In the vicinity of the container bottom, said hub carries an agitating tool having the shape of two vertically arranged lateral vanes furnished with apertures, the said vanes' lower edges sweeping along the container bottom when the hub is turning. The matter to be treated is delivered through a filler socket located above the disc. When the hub is turning, the filled-in matter will first be crushed by the cutting edges radially arranged in the disc and will then fall onto the bottom of the container. There, it will be agitated permanently by the agitating arms fitted close to the container bottom and will be kept in a homogeneous condition. In another embodiment, the agitating arms are designed as laterally projecting wire bows.

These designs of an agitating tool are not suitable for the treatment of pasty matter.

It is the object of the present invention to devise an agitating and kneading tool which permits to treat even particularly viscous and pasty matter, which allows to reliably prevent an overloading of the driven even when mixing very viscous matter without the provision of electric monitoring switches and which, therefore, is particularly suitable even for admixing additional ingredients, and which can be operated with low drive power.

Favourable improvements and embodiments can be gathered from the appended claims.

The agitating and kneading tool disclosed by the instant invention is composed of a swivel motively driven by a drive shaft and vertically arranged in the centre of a container. The said swivel carries one or more laterally projecting agitating arms which, on rotation, are directed closely adjacent to the container bottom in parallel thereto. In the capacity of further agitating tools, the swivel disposes at its upper end of one or more kneading blades which project laterally into the working space and which, advantageously, are designed as ribs. Preferably, said kneading blades and the swivel are of one-part design and are integrally injection moulded or compression moulded from plastics. While on turning the agitating arms passing along the bottom of the container serve to mix the dough and to admix various additions (ingredients), the kneading blades arranged on top thereof serve to knead the mixed dough.

The diameter of the swivel is larger in the area of the agitating arms than in the area of the kneading blades.

As a result, when kneading, an upwardly directed force is exerted on the dough, and the dough mass is prevented from descending on the bottom of the container, i.e. the mass is again and again conveyed upwards. This avoids that the load on the motor becomes undesirably high, while optimal kneading results are obtained. It has proved to be particularly favourable, if the swivel is of conical shape tapering from the base.

The inventive design of the agitating and kneading tool brings about that, when the tool is turning, the matter becoming more pasty when mixed moves outside of the range of the agitating arms extending in the vicinity of the container bottom. This ensures that, on rotation, a certain torque at the drive shaft will not be exceeded.

The admixed materials (ingredients) disposed on the bottom of the container are constantly mixed and whirled up and thus are permanently adjoined from downwards to the pasty matter on top of them. This way, it will be avoided that additions such as raisins or nuts become crushed or smashed between the agitating arms and the dough to be kneaded. According to a favourable improvement, the agitating arms disposed closely adjacent to the container bottom are of such elastic yielding design that, when the agitating arms are stirring the matter to be mixed or kneaded, the frictional resistance will not exceed a predetermined value. This effect can be attained in that the agitating arms are designed as elastically bendable rods or wires, for instance of stainless spring steel. Furthermore, it is possible to design the agitating arms such that each of them is elastically deformable in its effective cross-sectional surface, for example, by having their surface area consist of an elastically deformable material, their working surface being reduced thereby due to the counteracting force applied.

Owing to a like elastic design of the agitating arms, it will be avoided that, in the event of a per se inadvertent descent of the dough on the bottom of the container, the drive motor becomes overloaded or will even be slowed down until it stands still.

Hereinbelow, a favourable realisation of an agitating and kneading tool according to the instant invention will be described in respect of the accompanying drawing.

Figure 2:
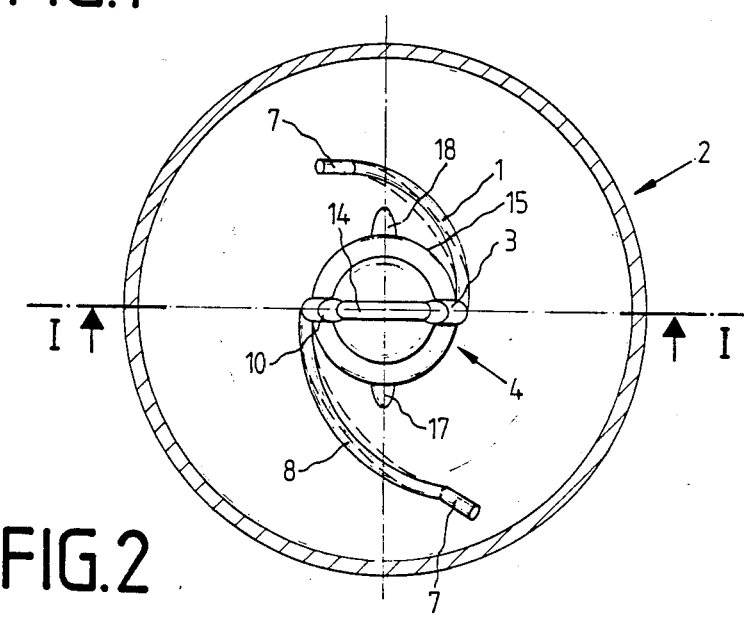

In the drawing,

FIG. 1 displays schematically a side view of a household appliance with an agitating and kneading tool, in a cross-section taken along the line I—I in FIG. 2, and FIG. 2 is a plan view on the agitating and kneading tool from a plane according to the line of intersection II—II in FIG. 1.

FIG. 1 shows a household appliance 16 in a cross-sectional side view comprising a drive motor 6 which, via a reduction gear formed by a belt drive, drives an agitating and kneading tool referred to globally by 4 via a shaft 9 which is arranged vertically in the centre of a mixing bowl 2 and which extends sealedly through the bottom of this container 2. The agitating and kneading tool 4 is secured to the drive shaft 9 either fixedly or by put-on and coupling engagement.

The agitating and kneading tool is composed of an upwardly tapering conical hub 15, at the lower area of which two rod-shaped agitating arms 1 and 8 are fastened. The agitating arms 1 and 8 extend substantially in parallel to the container bottom. With a view to mixing thoroughly, they are of different length and are bent in opposition to the direction of rotation of the hub 15. To increase the agitating effect, upwardly angled-off agitating rods 7 are fitted to the free ends of the agitating arms 1 and 8. The agitating arms 1, 8 are inclined in relation to the container bottom at an angle of roughly two degrss so that the radially outward section of the arms 1, 8 is spaced at a greater distance from the bottom than the section in the area of the hub 15.

The agitating arms consist of an elastic material so that they will be bent back more or less depending on the force exerted on them during agitation, in consequence whereof the arms' effective surface acting upon the matter to be mixed will change such as to not exceed a specific torque. The rods 12, 13 composed of spring steel form together with the arms 1, 8 a unit and, in the form of webs 12 and 13, extend upwards through the body of the hub 15 of the agitating and kneading tool 4, the webs extending beyond the hub 15 up to a bracket 14 with a view to allowing to easily take hold of the agitating tool for its removal. This design avoids any complicated mounting with a resilient tilting mechanism of the individual agitating arms 1, 8 since the rotation itself is elastically received by the steel wire.

In the upper zone, that means above the agitating arms 1 and 8, there is provision of two ribs 3 and 10 serving as additional kneading tools. These ribs 3, 10 project diametrally into the mixing zone of the container, and webs 12, 13 are embedded in ribs 3, 10.

On rotation of the hub 15, the pasty matter introduced into the container 2 from the top is kneaded by the ribs 3 and 10 serving as kneading tools between the inner wall of the container and the outer wall of the hub 15. Due to the upwardly tapering conical shape of the hub 15 itself, a force directed upwards to the opening of the container is applied on the dough, which force keeps the dough suspended during treatment and thus prevents the dough from descending into the zone of the agitating arms 1 and 8. The agitating arms 1 and 8 extending in the adjacency of the container bottom serve to mix the ingredients such as almonds or raisins which had previously been introduced into the container and, in doing so, to whirl them up so that they are integrated into the dough on top of them. The scoops 17, 18 fitted at the lower end of the kneading tool project radially outwardly beyond the ribs 3, 10 and extend offset by 90° relative to said ribs 3, 10. Said scoops 17, 18 serve as additional agitating elements, on the one hand, and as elements conveying the food outwardly, on the other hand.

The present invention has been explained by way of one practical embodiment. It is obvious for the one skilled in this art that, to achieve the object, a number of variations are possible which can be realised within the limits of this invention, if so desired.

Hence, the agitating arms may e.g. be fastened in a different manner to the hub of the agitating and kneading tool 4. The agitating arms can be realised likewise in different shapings. For instance, the arms may have a rectangular cross-section with varying lateral length and may be subjected to torsional stress, the respectively effective surface for mixing being changed depending on the counteracting force and the effective torque being adapted thereby. Other adaptations of the resistance of the agitating arms are also possible, for instance, by changing the surfaces between edged and round design.

The kneading blades 3, 10, too, may vary in number, shape and surface depending on what is required.

We claim:

1. Agitating and kneading tool for insertion into the center of a mixing bowl of an electrically driven household appliance, said tool comprising a hub and a one-piece wire member, said hub having an upper portion and two radially projecting, upwardly extending kneading rib portions in said upper portion, said hub being drivable in rotation by a drive shaft, and said one-piece wire member having two agitating arm portions and upwardly extending web portions that connect said agitating arm portions, said web portions being embedded in said kneading rib portions of said hub, and said agitating arm portions laterally projecting from said hub closely adjacent to the bottom of said hub, said agitating arm portions being differently shaped and extending radially outwardly in circumferential direction in opposition to the direction of rotation of said hub.

2. Agitating and kneading tool as claimed in claim 1 wherein said agitating arm portions are of elastic yielding design so that the frectional resistance caused on movement of the agitating arm portions in the matter to be mixed or kneaded will not exceed a predetermined value.

3. Agitating and kneading tool as claimed in any one of the preceding claims wherein said one-piece wire member is of stainless spring steel.

4. Agitating and kneading tool as claimed in claim 2 wherein said agitating arm portions are composed of an elastically deformable material at least in their surface area.

5. Agitating and kneading tool as claimed in either of claims 1 or 3
wherein the radially outward ends of said agitating arm portions are angled-off upwardly.

6. Agitating and kneading tool for insertion into the center of a mixing bowl of an electrically driven household appliance, said tool comprising a hub and a one-piece wire member, said hub having an upper portion, kneading rib portions in said upper portion, said hub being drivable in rotation by a drive shaft, and said one-piece wire member having two agitating arm portion, upwardly extending web portions that connect said agitating arm portions and a bracket portion that integrally connects said web portions, said web portions being embedded in said kneading rib portions of said hub and said bracket portions extending upwardly beyond said hub, and said agitating arm portions laterally projecting from said hub closely adjacent to the bottom of said hub, said agitating arm portions being differently shaped and extending radially outwardly in circumferential direction in opposition to the direction of rotation of said hub.

7. Agitating and kneading tool as claimed in claim 1 wherein said hub is of conical configuration and tapers from the bottom of the mixing bowl upwards.

8. Agitating and kneading tool as claimed in claim 1 wherein said hub and said kneading rib portions are incorporated in a one piece molded plastics member.

* * * * *

UNITED STATES PATENT AND TRADEMARK OFFICE
CERTIFICATE OF CORRECTION

PATENT NO. : 4,842,416
DATED : June 27, 1989
INVENTOR(S) : Albrecht Kelln, et al.

It is certified that error appears in the above-identified patent and that said Letters Patent is hereby corrected as shown below:

Col. 1, line 61, after "has" insert --as--.

Col. 2, line 55, "capacty" should be --capacity--.

Col. 5, line 25, "frectional" should be --frictional--.

Col. 6, line 4, "3" should be --2--.

Signed and Sealed this

Twenty-first Day of August, 1990

Attest:

HARRY F. MANBECK, JR.

*Attesting Officer*     *Commissioner of Patents and Trademarks*